United States Patent

Kidd et al.

Patent Number: 5,191,785
Date of Patent: Mar. 9, 1993

[54] METHOD AND APPARATUS FOR IDENTIFYING AND LOCATING A LEAK IN THE INNER LINER OF A VESSEL HAVING A LAMINATED WALL STRUCTURE

[75] Inventors: John A. Kidd, Rosemere; Swong V. Hoa, Brossard; Ramesh Janardhanam, Montreal, all of Canada

[73] Assignee: CPF Chemical Equipment Ltd., Canada

[21] Appl. No.: 685,653

[22] Filed: Apr. 16, 1991

[51] Int. Cl.⁵ .................. G01M 3/16; B65D 90/04
[52] U.S. Cl. .................... 73/49.2; 340/605; 220/415; 220/565
[58] Field of Search ............ 73/49.2, 49.2 R, 40, 73/40.5 R; 340/605; 324/557, 559; 220/415, 400, 420, 450, 565

[56] References Cited

U.S. PATENT DOCUMENTS

| | | | |
|---|---|---|---|
| 3,214,963 | 2/1965 | Schlumberger | 73/49.2 |
| 3,252,155 | 5/1966 | Surtees et al. | 73/49.2 |
| 3,383,863 | 5/1968 | Berry | 340/605 X |
| 3,911,727 | 10/1975 | Katsuta et al. | 73/49.2 X |
| 3,967,256 | 6/1976 | Galatis | 73/49.2 X |
| 4,110,739 | 8/1978 | Kidd | 73/49.2 X |
| 4,800,128 | 1/1989 | Schacht | 340/605 X |
| 4,876,530 | 4/1989 | Hill et al. | 340/605 |
| 4,922,232 | 1/1990 | Bosich | 340/605 |
| 4,947,470 | 9/1990 | Darilek | 340/605 |
| 4,985,682 | 1/1991 | Boryta | 340/605 X |

Primary Examiner—Hezron E. Williams
Assistant Examiner—Michael J. Brock
Attorney, Agent, or Firm—Larson and Taylor

[57] ABSTRACT

A vessel for containing an electro-conductive fluid, the vessel having a laminated wall structure and including an outer structural shell, an inner corrosion-resistant lining made of electrically non-conductive material, constituting a barrier between the structural shell and electro-conductive fluid in the vessel. An electrically resistive medium is mounted between the structural shell and the corrosion-resistant lining, the resistive medium carrying an array of electrodes mounted in spaced apart relationship at fixed and known locations. A main electrode is mounted in the vessel extending into the electro-conductive fluid which forms an electric path between the main electrode and the resistive medium in occurence of a fault in the corrosion-resistant liner, such that electro-conductive fluid is allowed to contact the resistive medium. An electronic controller impresses a voltage difference across electrodes of the array for causing electric current to circulate through the resistive medium. The controller obtains voltage drop measurements across the resistive medium between electrodes of the array and the contact point of the electro-conductive fluid on the resistive medium, to determine the location of the fault, each of the voltage drop measurements being between a respective electrode of the array and the main electrode.

11 Claims, 3 Drawing Sheets

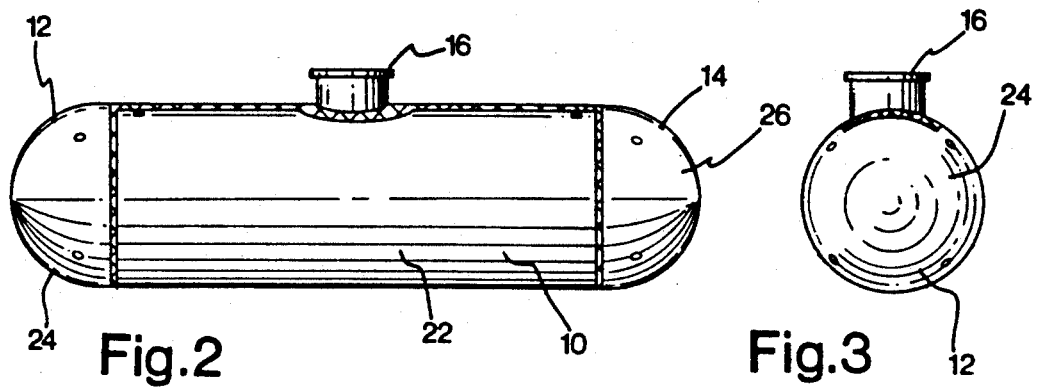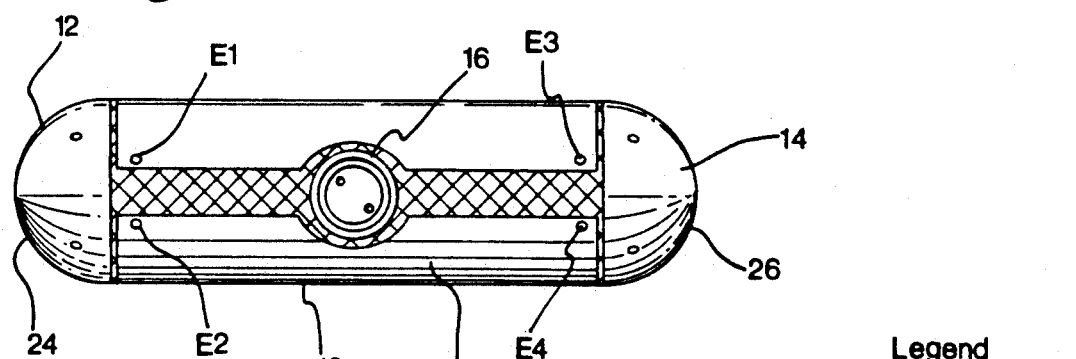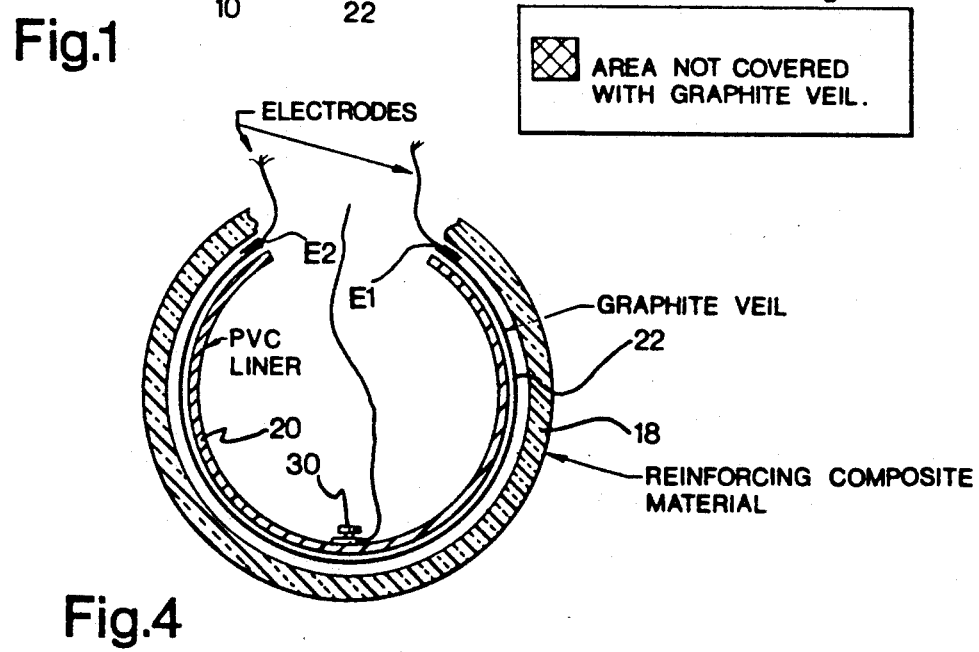

METHOD AND APPARATUS FOR IDENTIFYING AND LOCATING A LEAK IN THE INNER LINER OF A VESSEL HAVING A LAMINATED WALL STRUCTURE

FIELD OF THE INVENTION

The invention relates to early warning systems for detecting leakage in the inner corrosion-resistant lining or barrier of vessels such as tanks or piping, more particularly to a warning system which has the ability to identify the position of the leak. The invention also extends to a method for locating the leak in the inner corrosion-resistant lining of a vessel.

BACKGROUND OF THE INVENTION

In the past recent years, more and more tanks, vessels and piping for the chemical industry have been made of fibreglass reinforced polyester. The success of these structures and, more recently, those made of dual laminate construction consisting of an outer fibreglass reinforced polyester shell and an inner corrosion-resistant lining has depended to a great extent not only on the chemical resistance of the inner lining, but also on the ability of this inner lining to act as an effective vapour-liquid barrier. In other words, eventhough the fibreglass reinforced polyester forming the outer structure itself may be resistant to the chemical contained within the vessel, voids in the inner corrosion resistant lining may still allow the chemical contents to pass through this inner barrier and weaken the structural shell. At present, when the chemical contents do pass through the inner lining, it may take a period of months or years before it is apparent that failure of the lining has occured. In some instances, the first indication of such failure is a catastrophic leakage through the structural shell of the vessel.

It is known to use a metal foil, such as aluminum sheet, as a conducting layer between the inner lining and the outer structural shell to detect failures in the inner lining of the vessel. A failure will give rise to an electric path between the chemical, in most cases an electro-conductive fluid, and the conducting layer, allowing to easily detect the loss of integrity in the inner lining simply by monitoring the electrical impedance between the chemical and the conducting layer. However, the use of metal foils has serious disadvantages in applications where the contents of the vessel is a very corrosive material such as an inorganic acid. Should this acid leak through the inner lining of the vessel, it will rapidly and preferentially attack the metal foil and leave large areas of the inner lining no longer bonded to the structural outer layer of the vessel. A foil of a metal with similar resistance to PVC would be very expensive and rather defeat the object of using a plastic vessel for containing corrosive chemicals.

To overcome this drawback, it has been suggested to replace the metallic foil by a conducting or semiconducting layer incorporating finely divided graphite, carbon or metal particles contained in a glass mat. Such layer is highly resistant to corrosion capable to withstand exposure to various chemicals during long time periods.

A major difficulty with prior art leak detection systems resides in the inability of such systems to identify the position of the fault in the inner liner. When an alarm condition is generated, indicating loss of integrity of the inner liner, the entire vessel must be inspected in order to locate the fault. Minute cracks or punctures may be extremely difficult and time consuming to locate, especially in large vessels considerably increasing the vessel downtime.

OBJECTS AND STATEMENT OF THE INVENTION

An object of the present invention is a vessel having a laminated wall structure including an inner corrosion-resistant lining and an outer structural shell, provided with a system for locating a leak in the corrosion-resistant lining.

Another object of the invention is a method for locating a leak in the corrosion-resistant inner lining of a vessel having a laminated wall structure.

In one aspect, the invention provides a vessel for containing an electro-conductive fluid, the vessel having a laminated wall structure, including:

an outer structural shell;

an inner corrosion-resistant lining made of electrically non-conductive material, constituting a barrier between the structural shell and electro-conductive fluid in the vessel;

an electrically resistive medium between the structural shell and the corrosion-resistant lining;

an array of electrodes mounted in a spaced apart relationship at fixed and known locations to the resistive medium;

a main electrode in the vessel extending into the electro-conductive fluid which forms an electric path between the main electrode and the resistive medium in occurence of a fault in the corrosion-resistant lining, such that electro-conductive fluid is allowed to contact the resistive medium;

means for impressing a voltage difference across electrodes of the array for causing electric current to circulate through the resistive medium; and means for obtaining voltage drop measurements across the resistive medium between electrodes of the array and the contact point of electro-conductive fluid on the resistive medium, to determine the location of the fault, each of the voltage drop measurements being between a respective electrode of the array and the main electrode.

In a preferred embodiment, the voltage difference is impressed in succession across different pairs of electrodes to obtain two voltage drop measurements for each electrode pair, one between each electrode of the pair and the fluid contact point. From the voltage drop measurements, a graphic method is used to identify the fault location.

In a most preferred embodiment, the resistive medium is graphite which can withstand prolonged exposure to corrosive fluids stored in the vessel.

In another aspect, the invention provides a method for locating a leak in a vessel having a laminated wall structure, including:

an outer structural shell;

an inner corrosion-resistant lining made of electrically non-conductive material, constituting a barrier between the structural shell and electro-conductive fluid in the vessel;

an electrically resistive medium between the structural shell and the corrosion-resistant lining;

an array of electrodes mounted in a spaced apart relationship at fixed and known locations to the resistive medium;

a main electrode in the vessel extending into the electro-conductive fluid which forms an electric path between the main electrode and the resistive medium in occurence of a fault in the corrosion-resistant lining, such that electro-conductive fluid is allowed to contact the resistive medium, the method comprising the steps of:

impressing a voltage difference across electrodes of the array for causing electric current to circulate through the resistive medium; and obtaining voltage drop measurements across the resistive medium between electrodes of the array and the contact point of electro-conductive fluid on the resistive medium, to determine the location of the fault, each of the voltage drop measurements being between a respective electrode of the array and the main electrode.

The present invention is particularly advantageous because it permits to detect the position of a leak with a relative accuracy, independently of the conductivity characteristics of the fluid stored in the vessel. Since the current flow to provide the voltage drop measurements is established through the resistive medium whose parameters are known and are unlikely to change significantly over time, the leak locating method will produce accurate results during the entire useful life of the vessel and can be performed independently of the type of fluid in the vessel. As long as the fluid has some electrical conductivity, the detection method can be carried out.

BRIEF DESCRIPTION OF THE DRAWINGS

FIG. 1 is a schematical top view of a vessel constructed in accordance with the invention;

FIG. 2 is a side elevational view of the vessel shown in FIG. 1;

FIG. 3 is a front view of the vessel shown in FIGS. 1 and 2;

FIG. 4 is an enlarged cross-sectional view of the vessel shown in FIGS. 1, 2 and 3, depicting the location of two electrodes used for identifying the position of a leak;

DESCRIPTION OF A PREFERRED EMBODIMENT

Figure 5:
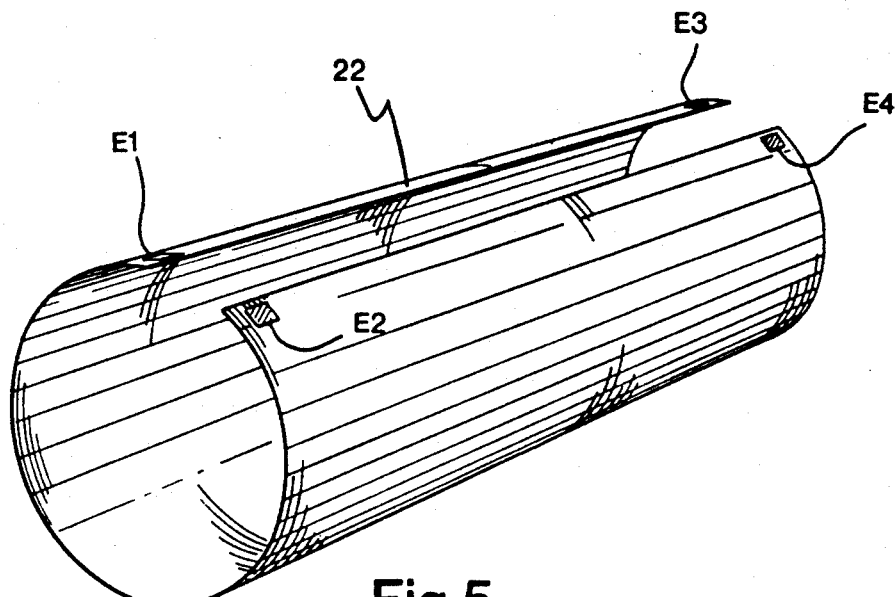
FIG. 5 is a three-dimensional schematical illustration of the electrically resistive medium and its electrodes, monitoring the main body of the vessel.

With reference to FIGS. 1, 2 and 3, a vessel 10, constructed in accordance with the present invention, comprises a generally cylindrical main body 10 with hemispherical end portions 12 and 14, respectively. A flange assembly 16 is centrally mounted on the main body 10. The flange assembly 16 serves to connect the vessel to a conduit system for supplying and withdrawing fluid from the vessel.

FIG. 4 illustrates schematically the wall-structure of the vessel. The latter comprises an outer structural shell made of fibre reinforced plastic material and an inner relatively thin polyvinyl chloride liner 20. The liner 20 is highly resistant to corrosive action and forms a barrier between corrosive fluids stored in the vessel and the outer structural shell 18. In absence of such barrier, the structural integrity and the fluid tightness of the vessel may be compromised over a certain number of years of service as a result of slow disintegration of the shell 18 caused by the corrosive materials in the vessel.

Although the liner 20 has the ability to resist corrosive materials, it may accidentally or as a result of wear, fail, which will produce a leak exposing the structural shell 18 to the chemical stored in the vessel. As it has been discussed in the introductory portion of the specification, such leakage may, over time, create a catastrophic vessel failure.

The present invention provides an early warning system which monitors the vessel for lining failures and, in occurence of such failure, determines the location of the leak. The leak location system comprises a graphite veil mounted between the liner 20 and the structural shell 18 on which are implanted an array of electrodes to establish a current flow through the electrically resistive graphite veil. By using a voltage division principle, the location of the contact point of the fluid in the vessel and the graphite veil, which corresponds to the position of the fault on the liner 20, can be identified.

Ideally, the graphite veil should extend over the entire surface of the liner 20 to monitor 100% of the vessel surface. However, due to practical limitations, this is not always possible. It has been found that the graphite veil configuration as shown in FIGS. 1, 2, 3 and 5, is satisfactory because it is relatively simple to manufacture and install while providing relatively accurate results. The graphite veil is separated in three sections which are electrically isolated from one another. The main section of the veil, identified by the reference numeral 22, has a truncated tubular configuration and extends over the main body of the vessel. The sections 24 and 26 are hemispherical, conforming in shape to the vessel end portions.

Figure 6:
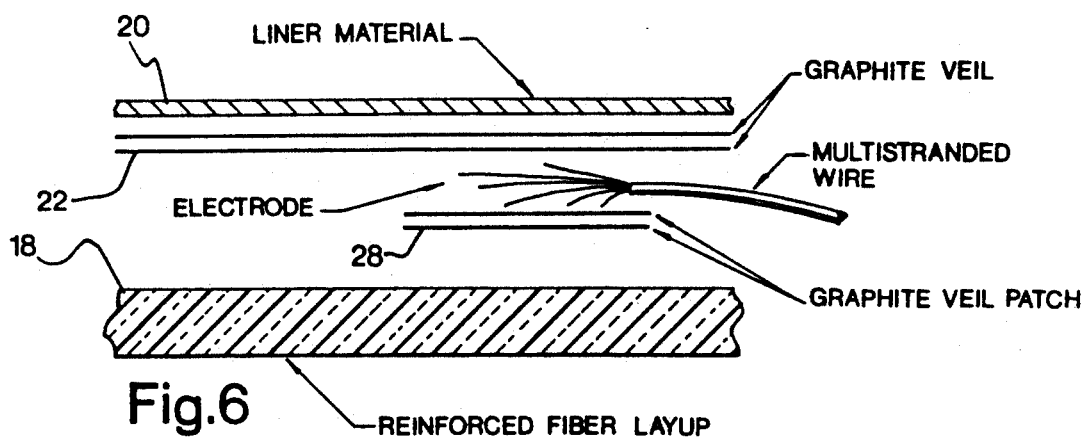
FIG. 6 is an enlarged cross-sectional view of the electrically resistive medium, illustrating the method used for implanting an electrode therein.
Figure 8:
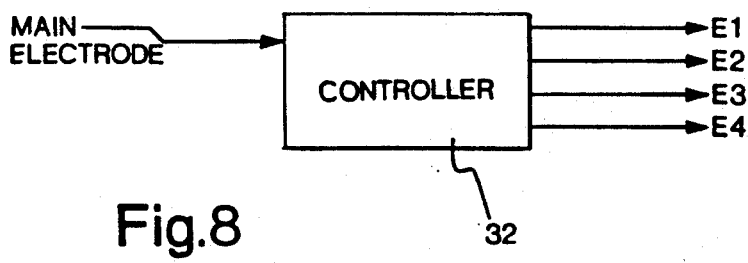
FIG. 8 is a schematical view of an electronic controller to automatically operate the leak location system according to the invention.

Electrodes E1, E2, E3 and E4 are implanted at the edges of the section 22 of the graphite veil. With reference to FIG. 6, each electrode is a 22 gauge multistranded cable stripped at the end to expose the conductors which are separated from one another and applied flat against the section 22 of the graphite veil. A 2-inch by 2-inch graphite veil patch 28 is applied over the exposed conductors. The purpose of the patch 28 is two-fold. Firstly, it retains in place the multi-stranded cable. Secondly, it prevents direct electric contact between the cable and the outer shell 18 to prevent the conductivity of the outer shell, if any, to influence the operation of the leak location system. The patch 28 may be retained against the section 22 of the graphite veil by an adhesive or any other suitable means.

The leak detection system also comprises a main electrode 30 located in the lower section of the vessel so that it remains in contact with fluid even when the vessel is nearly depleted or empty. The electrode 30 is preferably made of platinum to provide electrical conductivity and high resistance to corrosion.

The electrodes E1, E2, E3 and E4 and the electrode 30 are connected to an electronic controller 32, such as a micro-computer which automatically operates the leak location system as it will be described hereinafter. The following description will only refer to the main section 22 of the graphite veil, and it should be understood that the sections 24 and 26 of the graphite veil covering the end-portions of the vessel are operated in an identical manner, but independently from one another and from the main section.

The electronic controller 32 contains a voltage source which impresses in succession a voltage difference across various electrode pairs. With four electrodes E1, E2, E3 and E4, twelve permutations of electrode pairs are possible. When a certain pair of electrodes has been energized, an electric current will flow through the section 22 of the graphite veil. Since the graphite is an electrically resistive material, this current flow will establish a voltage drop gradient from one electrode to the other of the energized pair of electrodes.

Once this current flow has been established, the controller measures the voltage difference between the main electrode 30 in the vessel and each electrode of the energized pair of electrodes. Two voltage measurements are obtained, corresponding to the voltage drop across the main section 22 of the graphite veil between each electrode of the pair and the contact point of the fluid on the main section 22 of the graphite veil, through the liner 20, which contact point corresponds to the location of the fault. Once these voltage drop measurements have been obtained for a given pair, another pair of electrodes is energized to obtain another set of values. Once all the electrode pairs have been energized, all the voltage drop measurements are used for graphically constructing a map indicating the location of the leak.

The following specific example will provide a better understanding of the method for identifying the leak, which is to be read in conjunction with Table 1.

In Table 1, the column "ELECTRODES" shows the sequence of electrode energization which is coded in the following manner. The first electrode of the pair is at the ground potential. The second electrode of the pair is at the positive terminal of the voltage source in the controller 32, which is set at +10 VDC.

The column V1 is the voltage difference between the main electrode 30 and the electrode at the ground potential. This corresponds to the voltage drop across the main section 22 on the graphite veil, between the grounded electrode and the fluid contact point.

The column "V2" is the voltage difference between the main e)ectrode 30 and the second electrode of the pair which is connected to the positive terminal of the voltage source. This value corresponds to the voltage drop across the main section 22 of the graphite veil between the second electrode and the fluid contact point.

The column "V1+V2" corresponds to the sum of the values in the V1 and V2 columns.

The column "Z" is the distance between the electrodes in the pair expressed in inches.

The column "X1" is a distance value measure along an axis interconnecting the electrodes of the pair and which is proportional to the voltage drop in the V1 column. The X1 values are expressed in inches and are calculated according to the following formula:

$$X1 = \frac{V1 \cdot Z}{V1 + V2}$$

The column "X2" is a distance measurement along an axis interconnecting the electrodes of the pair which is proportional to the voltage drop value in the V2 column. This distance is expressed in inches and it is calculated by the following formula:

$$X2 = \frac{V2 \cdot Z}{V1 + V2}$$

| ELECTRODE | FLUID-WATER (TANK FULL) | | | | | |
|---|---|---|---|---|---|---|
| | V1 | V2 | V1+V2 | Z | X1 | X2 |
| E1.E4 | 3.2080 | 4.767 | 7.9688 | 106.00 | 42.67 | 63.33 |
| E1.E4 | 3.4668 | 4.4043 | 7.8711 | 67.00 | 29.51 | 37.49 |
| E1.E2 | 3.0811 | 4.7656 | 7.8467 | 78.00 | 30.63 | 47.37 |
| E2.E4 | 3.9404 | 3.8916 | 7.8320 | 67.00 | 33.71 | 33.29 |
| E2.E3 | 4.2529 | 3.5596 | 7.8125 | 106.00 | 57.70 | 48.30 |
| E2.E1 | 4.7363 | 3.0469 | 7.7832 | 78.00 | 47.47 | 30.53 |
| E3.E4 | 3.5693 | 4.2529 | 7.8223 | 78.00 | 35.59 | 42.41 |
| E3.E2 | 3.5547 | 4.2432 | 7.7979 | 106.00 | 48.32 | 57.68 |
| E3.E1 | 4.3652 | 3.4229 | 7.7881 | 67.00 | 37.55 | 29.45 |
| E4.E3 | 4.2529 | 3.5596 | 7.8125 | 78.00 | 42.46 | 35.54 |
| E4.E2 | 3.8721 | 3.9209 | 7.7930 | 67.00 | 33.29 | 33.71 |
| E4.E1 | 4.6973 | 3.1104 | 7.8076 | 106.00 | 63.77 | 42.23 |

DISCUSSION

As it has been mentioned earlier, an array of four electrodes on the main section 22 of the graphite veils allows twelve permutations of electrode pairs. Six of these permutations are redundant, however, this redundancy is used by the controller 32 to check for proper operation of the system, i.e. data for E1.E4 must be approximately equal to E4.E1 but in the reverse order. For example, the values in the V1 and V2 columns for E1.E4 are 3.2080 and 4.7607 respectively, and the values in the same two columns for E4.E1 are 4.6973 and 3.1104. Therefore, the data collected for this point is valid.

Figure 7:
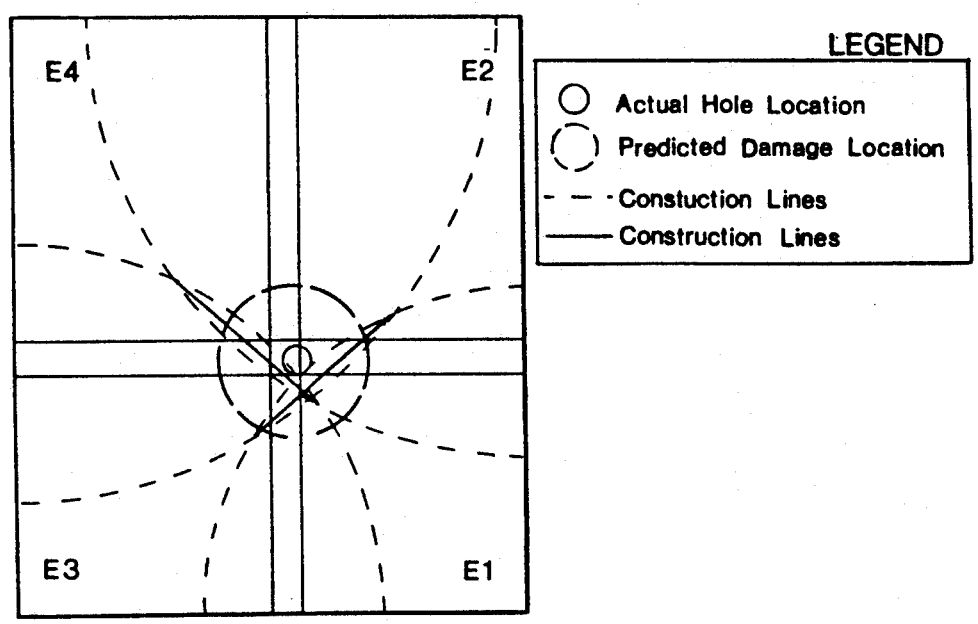
FIG. 7 is a schematical illustration of the electrically resistive medium depicted in FIG. 5, shown in a planar configuration for illustrating the graphic process to identify the location of a leak.

FIG. 7 illustrates a process for graphically identifying the position of the leak from the data shown in the above Table. First an enclosure connecting the four electrodes E1, E2, E3, E4 is drawn. Using E1 as the center, an arc of radius equal to the number in the X1 column in Table 3 is drawn. Similarly, using E4 as the center, another arc of radius equal to the number in X2 column in Table 3 is drawn.

If the arcs intersect, then a line is drawn through the two intersection points. If the arcs do not intersect, then a line that is a tangent to both arcs must be drawn. This same process is carried out for the E2.E3 electrode pair. The two tangents lines or two lines going through the intersection of the arcs are then extended until they intersect each other.

The four other electrode pairs, i.e. E1.E3, E1.E2, E2.E4 and E3.E4, are represented by single lines and they are constructed as follows. Using E1 as the origin, a line is drawn perpendicular to E1.E3 offset from E1 by a distance corresponding to the value X1 in Table 1. Using E2.E1 as the origin, a line is drawn perpendicular to E2.E1 offset from E2 by a distance corresponding to value X2 in Table 1. The same process is repeated for E2.E4 and E3.E4 electrode pairs.

The location of the leak can be predicted to be in the area of greatest concentration of intersecting lines.

The above process can be performed automatically by the controller 32 which supplies the data predicting the location of the leak.

The above description of the invention should not be interpreted in any limiting manner as various refinements and variations are possible without departing from the spirit of the invention. The scope of the invention is defined in the annexed claims.

We claim:

1. A vessel for containing an electro-conductive fluid, said vessel having a laminated wall structure, including:
   an outer structural shell;
   an inner corrosion-resistant lining made of electrically non-conductive material, constituting a barrier between said structural shell and electro-conductive fluid in the vessel;
   an electrically resistive medium between said structural shell and said corrosion-resistant lining;
   an array of electrodes mounted in a spaced apart relationship at fixed and known locations to said resistive medium;
   a main electrode in said vessel extending into the electro-conductive fluid which forms an electric path between said main electrode and said resistive medium in occurence of a fault in said corrosion-resistant lining, such that electro-conductive fluid is allowed to contact said resistive medium;
   means for impressing a voltage difference across electrodes of said array for causing electric current to flow through said resistive medium; and
   means for obtaining voltage drop measurements across said resistive medium between electrodes of said array and the contact point of electro-conductive fluid on said resistive medium, to determine the location of said fault on said lining which corresponds to said contact point, each of said voltage drop measurements being between a respective electrode of said array and said main electrode.

2. A vessel as defined in claim 1, wherein said means for obtaining voltage drop measurements across said resistive medium comprises a voltage measuring device.

3. A vessel as defined in claim 1, wherein said means for impressing a voltage difference across electrodes of said array comprises a voltage source.

4. A vessel as defined in claim 1, comprising means for impressing a voltage difference across different pairs of electrodes of said array, and means for obtaining a voltage drop measurement across said resistive medium between each electrode of a pair and said contact point.

5. A vessel as defined in claim 4, further comprising data processing means for interpreting the voltage drop measurement for identifying the location of said fault.

6. A vessel as defined in claim 1, wherein the electrodes of said array are located adjacent the boundary of said resistive medium.

7. A vessel as defined in claim 1, wherein said resistive medium is graphite.

8. A vessel as defined in claim 1, wherein said outer structural shell is made of composite material.

9. A vessel as defined in claim 1, wherein said liner is made of thermoplastic material.

10. A method for locating a leak in a vessel having a laminated wall structure including:
    an outer structural shell;
    an inner corrosion-resistant lining made of electrically non-conductive material, constituting a barrier between said structural shell and electroconductive fluid in the vessel;
    an electrically resistive medium between said structural shell and said corrosion-resistant lining;
    an array of electrodes mounted in a spaced apart relationship at fixed and known looations to said resistive medium;
    a main electrode in said vessel extending into the electro-conductive fluid which forms an electric path between said main electrode and said resistive medium in occurence of a fault in said corrosion-resistant liner, such that electro-conductive fluid is allowed to contact said resistive medium, said method comprising the steps of:
    impressing a voltage difference across electrodes of said array for causing electric current to flow through said resistive medium; and
    obtaining voltage drop measurements across said resistive medium between electrodes of said array and the contact point of electro-conductive fluid on said resistive medium, to determine the location of said fault, each of said voltage drop measurements being between a respective electrode of said array and said main electrode.

11. The method of claim 10, comprising the step of successively impressing said voltage difference across different pairs of electrodes of said array, and for each pair determining two voltage drop measurements across said resistive medium, one between each electrode of the pair and said contact point.

* * * * *